(12) United States Patent
Angott

(10) Patent No.: US 6,556,598 B1
(45) Date of Patent: Apr. 29, 2003

(54) LASER GUIDANCE ASSEMBLY FOR A VEHICLE

(75) Inventor: Paul G. Angott, Bloomfield Hills, MI (US)

(73) Assignee: Self-Guided Systems, LLC, Bloomfield Hills, MI (US)

( * ) Notice: Subject to any disclaimer, the term of this patent is extended or adjusted under 35 U.S.C. 154(b) by 300 days.

(21) Appl. No.: 09/621,204

(22) Filed: Jul. 21, 2000

(51) Int. Cl.[7] .................................................. H01S 3/10
(52) U.S. Cl. .............................................. 372/9; 701/23
(58) Field of Search ................................ 372/9; 701/23, 701/25; 356/622; 901/1; 180/167

(56) References Cited

U.S. PATENT DOCUMENTS

| | | | | |
|---|---|---|---|---|
| 4,918,607 A | * | 4/1990 | Wible | 701/23 |
| 5,005,128 A | * | 4/1991 | Robins et al. | 701/23 |
| 5,260,770 A | * | 11/1993 | Nakamura et al. | 356/622 |
| 5,367,458 A | * | 11/1994 | Roberts et al. | 701/25 |
| 5,426,584 A | | 6/1995 | Kamimura et al. | 701/25 |
| 5,493,388 A | * | 2/1996 | Adachi | 356/5.01 |
| 5,648,852 A | * | 7/1997 | Kato et al. | 356/622 |
| 6,034,803 A | * | 3/2000 | Sullivan et al. | 359/196 |

* cited by examiner

*Primary Examiner*—Quyen Leung
*Assistant Examiner*—Jeffrey N Zahn
(74) *Attorney, Agent, or Firm*—Howard & Howard

(57) ABSTRACT

The laser guidance assembly (20) includes a platform (26) supported on a vehicle. A mirror support (24) is rotatably supported by the platform (26) for rotation about a vertical axis. A first mirror (22) is supported by the mirror support (24) for rotation about the vertical axis. The assembly (20) further includes a diode (30) attached to the platform (26) for emitting a laser beam (32) in a laser path (34). The assembly (20) is characterized by having a pivotal connection (36) between the first mirror (22) and the mirror support (24) for allowing oscillation of the first mirror (22) about a horizontal axis (48) relative to the platform (26) and the mirror support (24). The assembly (20) has a second mirror (38) supported by the platform (26) and fixed relative to the platform (26) for reflecting a reflected laser beam (40) from the first mirror (22). The second mirror (38) has a filter section (44) and reflective section (46) for allowing the laser beam (32) to pass through and for reflecting the reflected laser beam (40). A processor (52) integrates a first signal (132) which is the reflected laser beam (40) signal, an oscillation signal (134) for the position of the first mirror (22) about the horizontal axis (48), and a rotational signal (136) for the position of the first mirror (22) about the vertical axis (28) to determine the precise location of a lawn mower upon which the assembly (20) is mounted.

28 Claims, 11 Drawing Sheets

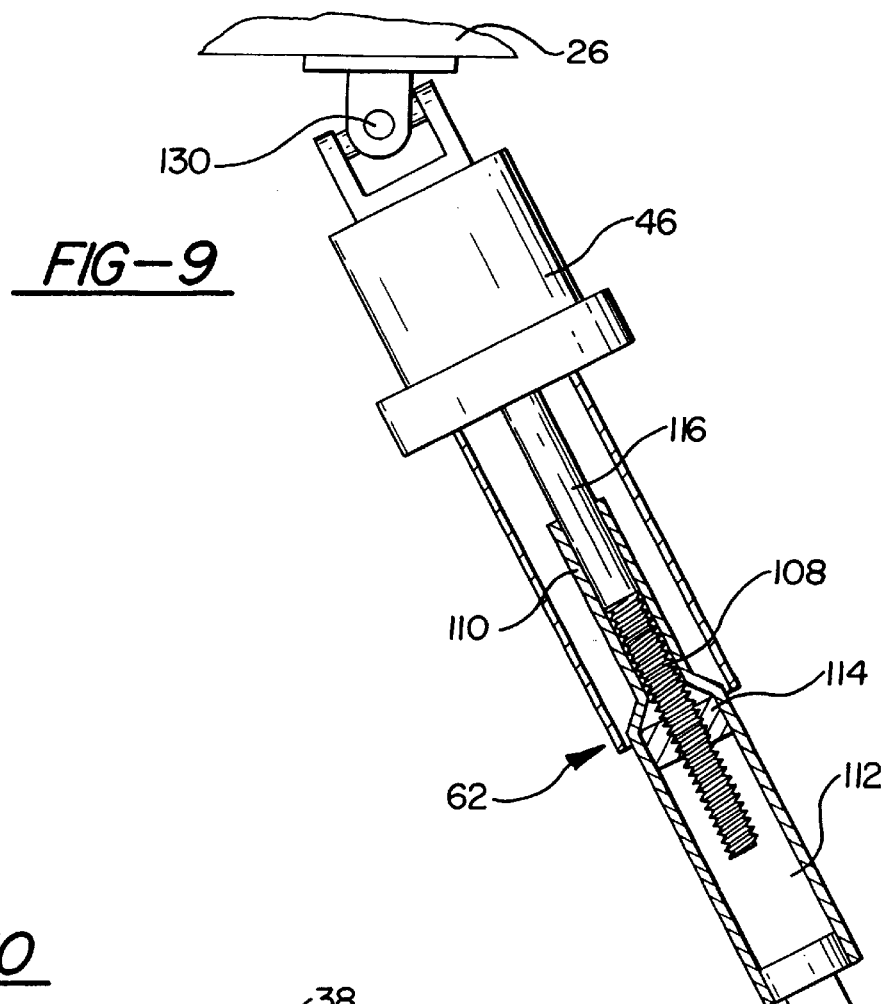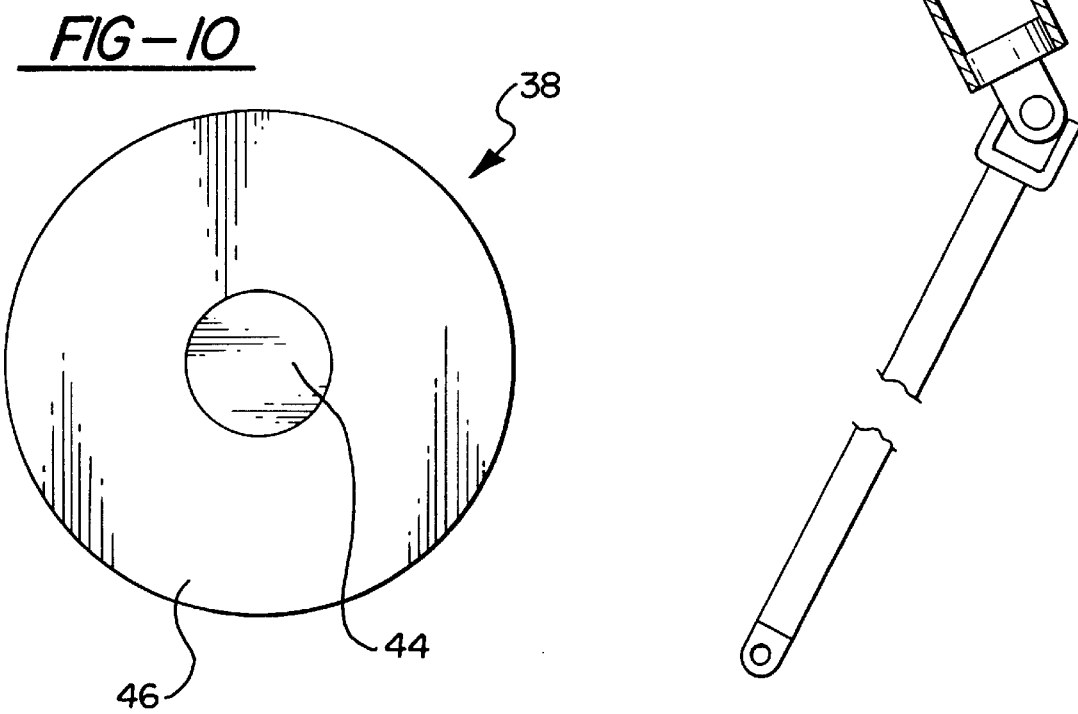

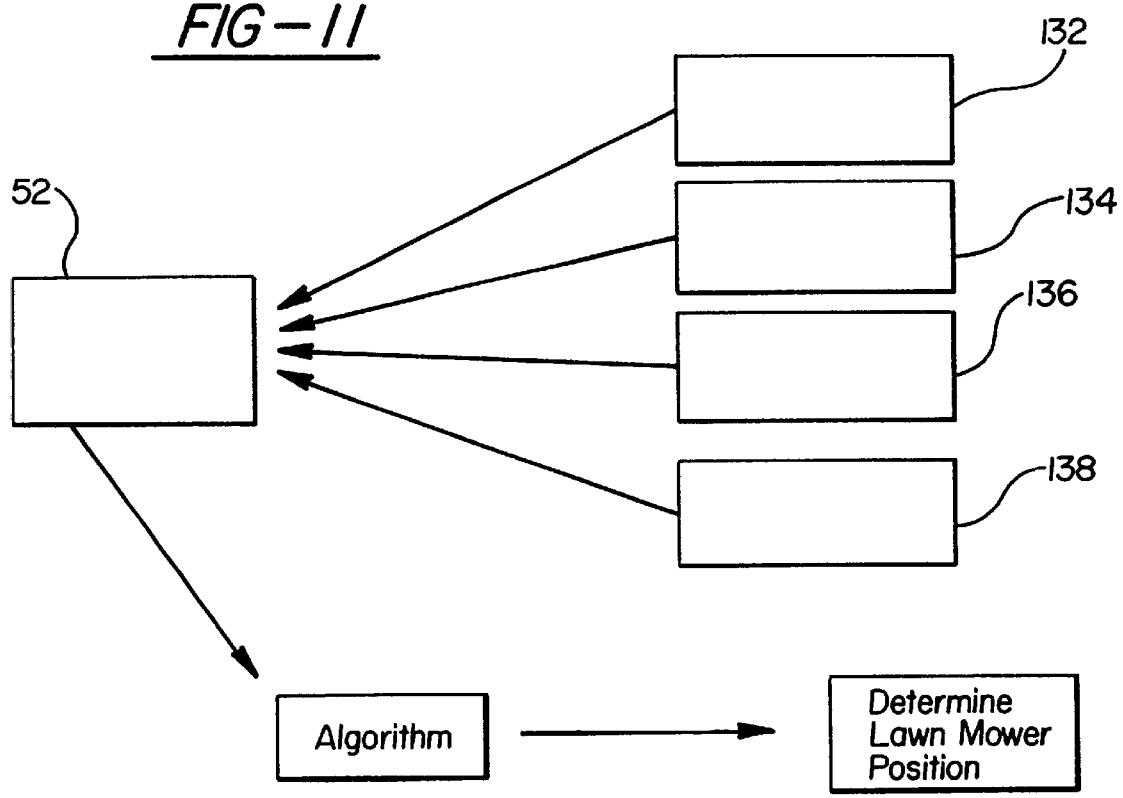

LASER GUIDANCE ASSEMBLY FOR A VEHICLE

BACKGROUND OF THE INVENTION

1. Field of the Invention

The subject invention relates to a laser guidance assembly for a lawn mower for navigating the lawn mower across a specified terrain.

2. Description of the Prior Art

Various laser-guided vehicles are well known in the prior art which utilize laser guidance systems to navigate across a terrain. The laser guidance assemblies usually include a first mirror supported by a mirror support, a diode for emitting a laser beam in a laser path to the first mirror for reflection by the first mirror in a generally horizontal direction to a course reflector, and a platform rotatably supporting the mirror support for rotation of the first mirror about a vertical axis. However, the first mirror is held at a fixed angle relative to the platform and is unable to scan in a vertical plane to locate the course reflectors as the lawn mower traverses uneven terrain.

One guidance system, shown in U.S. Pat. No. 5,426,584 included mounting the guidance system between a plurality of gimbaled brackets which would allow the laser beam to be scanned vertically without changing the angle of the mirror. As the lawn mower traversed uneven terrain, the entire assembly would shift to remain normal with gravity. The shifting is very erratic and unsteady. A drive was added to control the shifting of the assembly and the gimbaled brackets. However, the mounting of the guidance system between the brackets does not allow precise movement of the first mirror angle to precisely locate the course reflectors. The inaccurate measurement of the location of the course reflectors will produce an incorrect position for the lawn mower.

SUMMARY OF THE INVENTION AND ADVANTAGES

The invention provides a laser guidance assembly for a vehicle. The assembly includes a platform supported by the vehicle and a mirror support rotatably supported by the platform and being rotatable about a vertical axis relative to the platform. A first mirror is supported by the mirror support rotatable about the vertical axis. A diode emits a laser beam in a laser path to the first mirror for reflection by the first mirror in a generally horizontal direction. The laser guidance assembly is characterized by having a pivotal connection between the first mirror and the mirror support for allowing oscillation of the first mirror about a horizontal axis relative to and independent of the platform and the mirror support.

The invention provides a laser guidance assembly for a lawn mower including a first mirror, a diode for emitting a laser beam in a laser path to the first mirror for reflection by the first mirror in a generally horizontal direction, a mirror support supporting the first mirror, a course reflector for directing a reflected laser beam back to the first mirror, and a platform rotatably supporting the mirror support for rotation of the first mirror about a vertical axis. The laser guidance assembly is characterized by having a pivotal connection between the first mirror and the mirror support for allowing oscillation of the first mirror about a horizontal axis relative to the diode during rotation of the mirror support about the vertical axis.

The pivotal connection allows the angle of the first mirror to be precisely controlled for locating the course reflector. The determination of the precise location of the course reflector allows the lawn mower to be operated with much tighter tolerances which allow the lawn mower to be more accurate.

BRIEF DESCRIPTION OF THE DRAWINGS

Other advantages of the present invention will be readily appreciated as the same becomes better understood by reference to the following detailed description when considered in connection with the accompanying drawings wherein:

FIG. 9 is side perspective view of the oscillation drive and a screw rod for oscillating the first mirror about the horizontal axis; and FIG. 10 is a top view of a second mirror showing a filter portion and a reflective portion;

FIG. 11 is a flowchart showing a processor receiving a plurality of signal inputs for calculating the position of the lawn mower;

DETAILED DESCRIPTION OF THE PREFERRED EMBODIMENT

Figure 1:
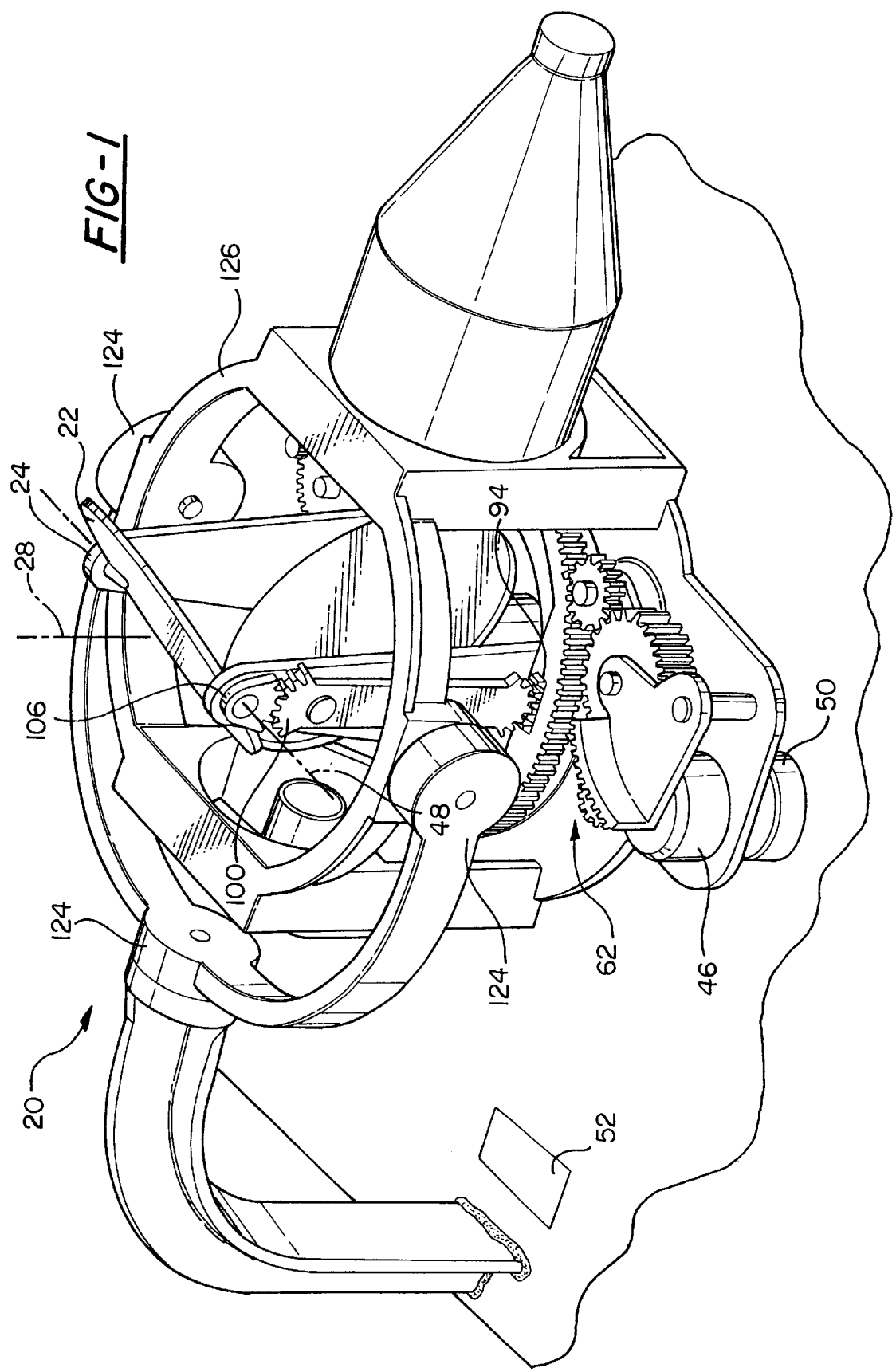
FIG. 1 is a perspective view of one embodiment of a laser guidance assembly for a lawn mower.

Referring to the Figures, wherein like numerals indicate like or corresponding parts throughout the several views, a laser guidance assembly for a lawn mower is generally shown at 20 in FIG. 1.

Figure 5:
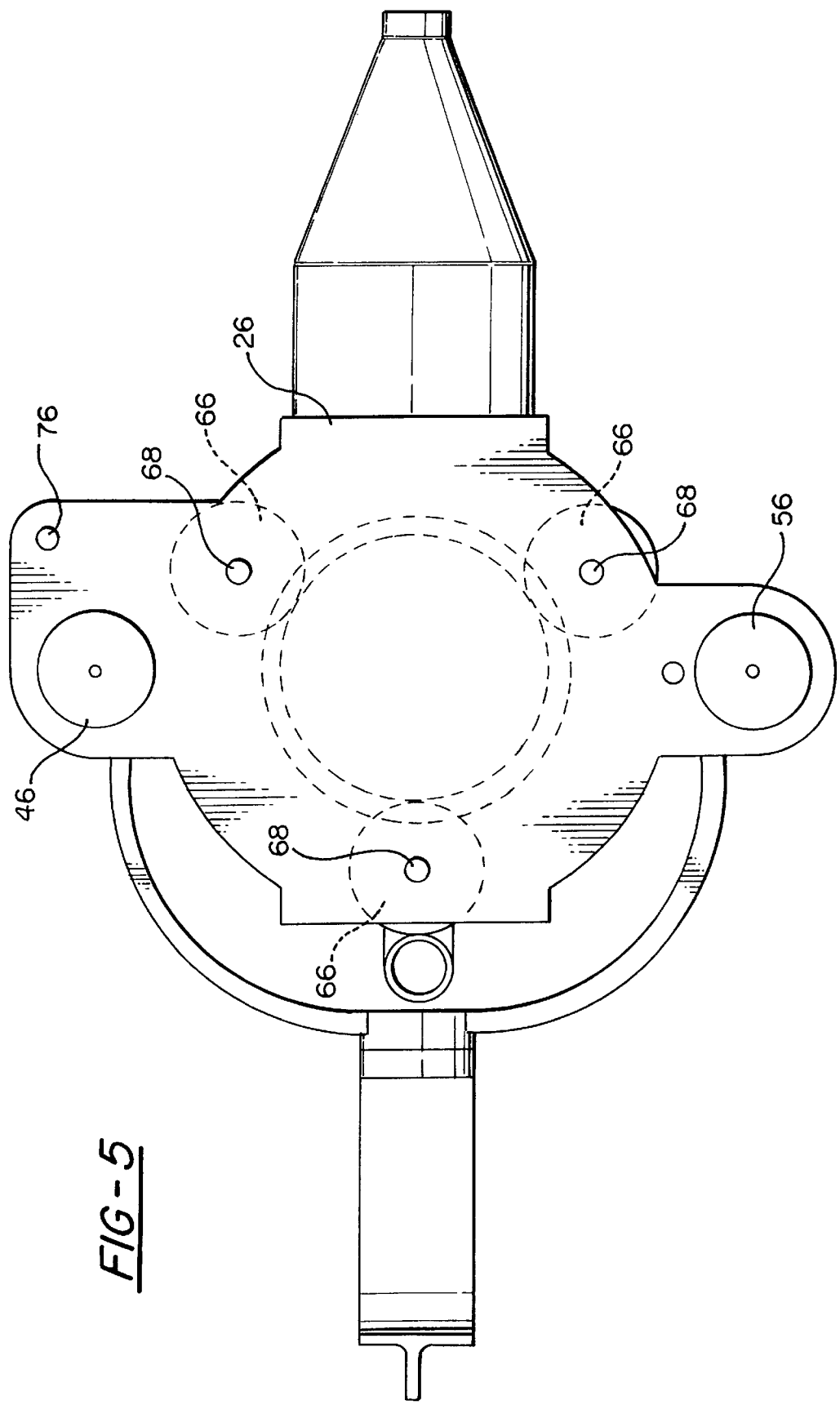
FIG. 5 is a bottom view of one embodiment of the laser guidance assembly for the lawn mower.
Figure 7:
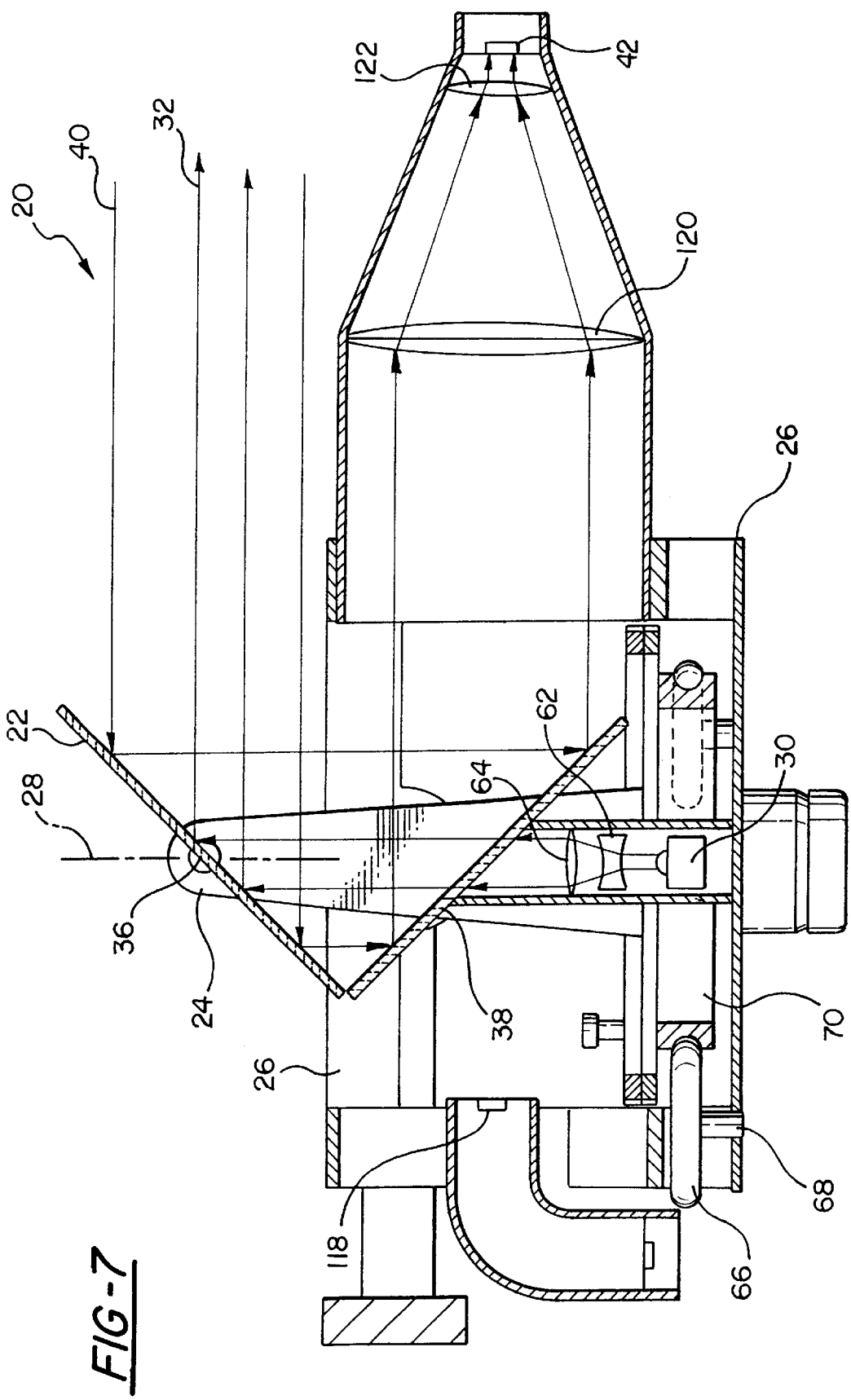
FIG. 7 is a cross-sectional view of one embodiment of the laser guidance assembly for the lawn mower.

The assembly 20 includes a platform 26 rotatably supporting a mirror support 24 for rotation of a first mirror 22 about a vertical axis 28. The mirror support 24 is supported by a plurality of bearing wheels 66 which are attached to the platform 26, as shown in FIGS. 5 & 7. Each bearing wheel has a shaft 68 with one end being fixedly attached to the platform 26. The bearing wheels 66 rotate about the shaft 68 for rotating the first mirror 22 about the vertical axis 28. The mirror support 24 may further include a hub 70 and a rotating ring 88.

Figure 2:
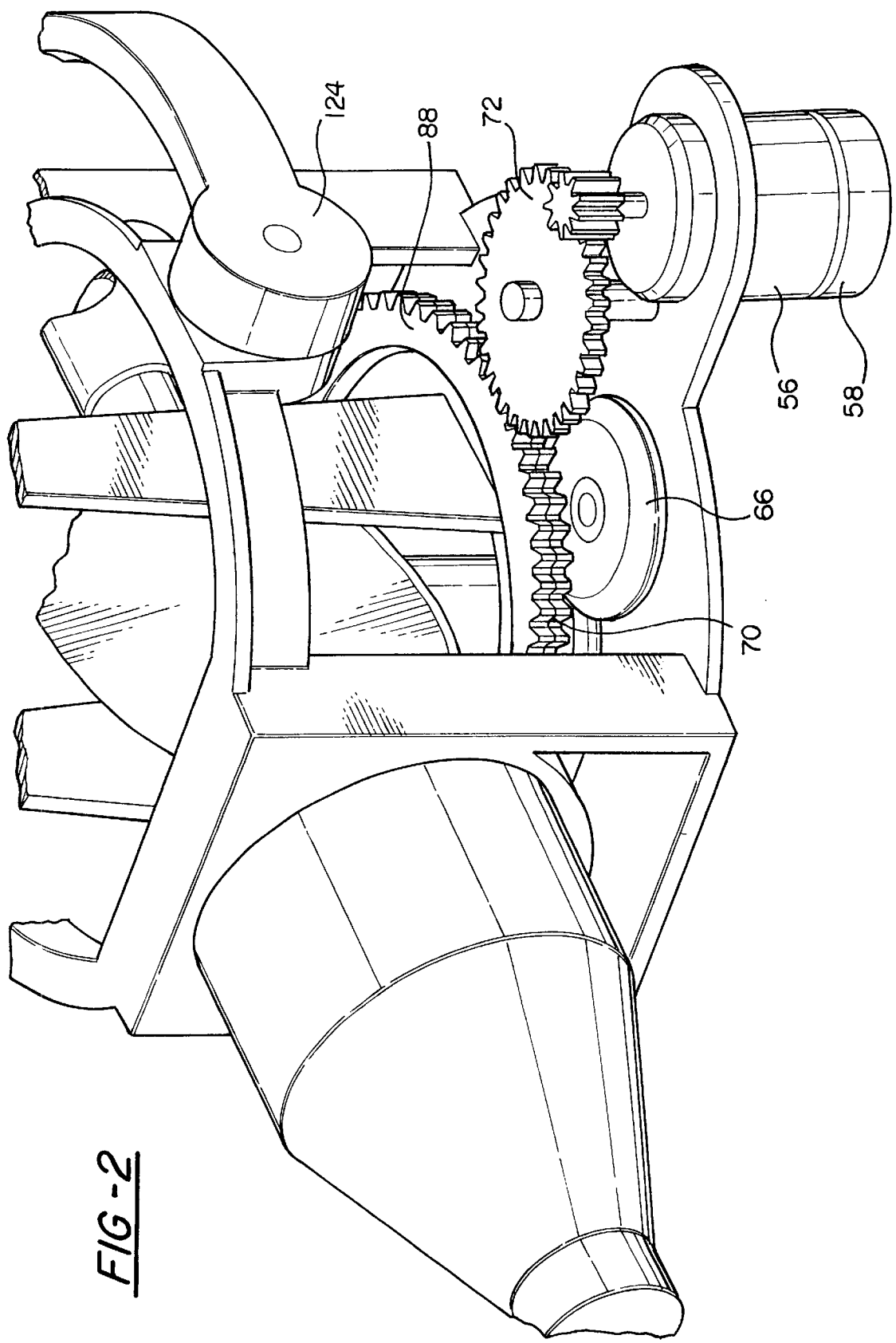
FIG. 2 is a perspective view of a rotation drive and a rotation encoder for rotating a mirror support about a vertical axis.
Figure 4:
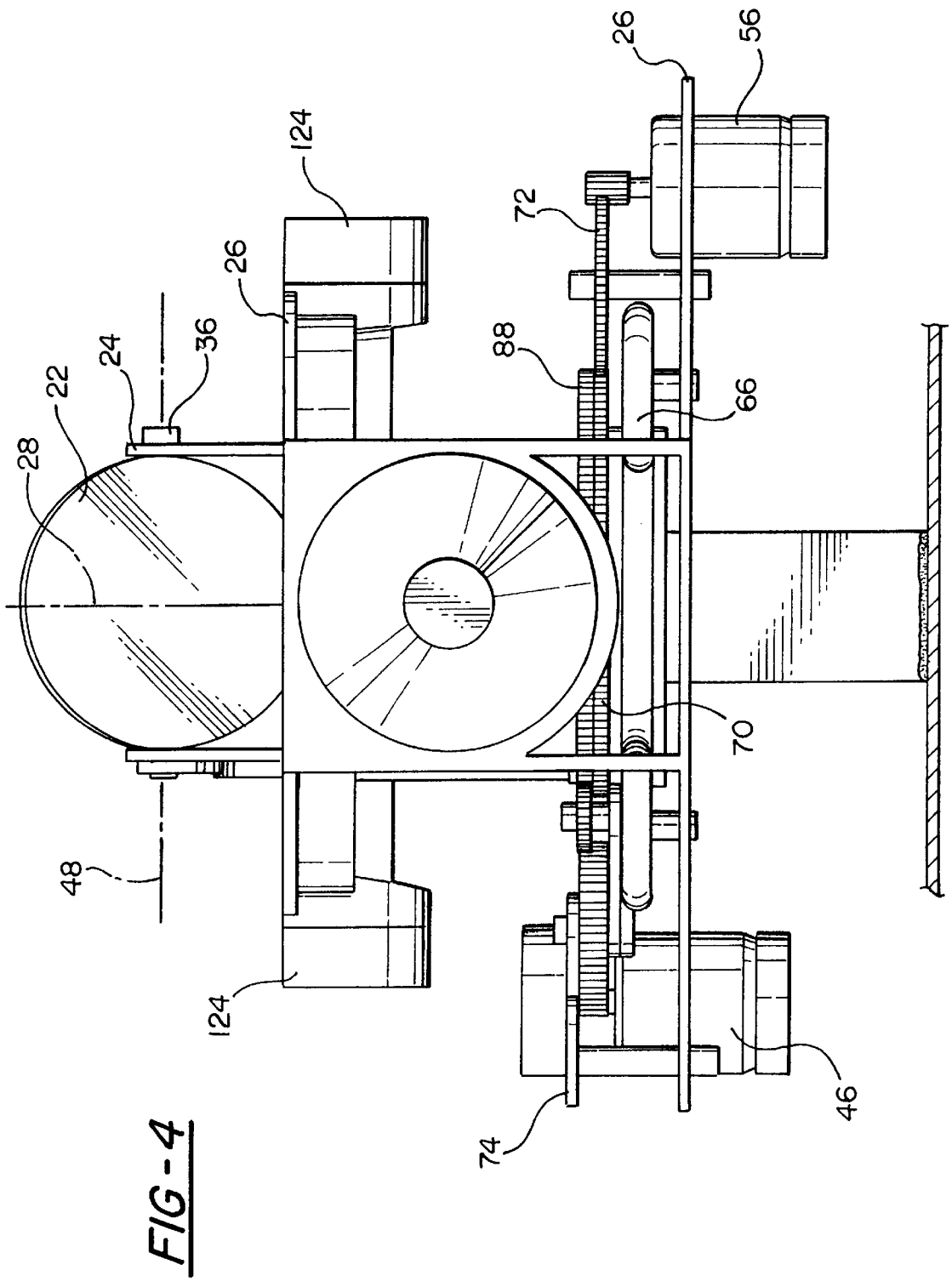
FIG. 4 is a front view of one embodiment of the laser guidance assembly for the lawn mower.

The mirror support 24 is operatively connected to a rotation drive 56 for rotating the first mirror 22 about the vertical axis 28. The rotation drive 56 is preferably a motor but may be any device capable of rotating the mirror support 24 about the vertical axis 28. FIG. 2 shows one embodiment having a gear 72 positioned between the rotation drive 56 and the hub 70. However, the rotation drive 56 may connect directly to the hub 70. The rotation drive 56 is further defined by being fixedly attached to the platform 26, as shown in FIGS. 4 & 5. The rotation drive 56 is connected to a rotation encoder 58 for measuring revolutions of the rotation drive 56 and transmitting a rotational signal 136, as shown in FIG. 11, to a processor 52 for determining a position of the first mirror 22 about the vertical axis 28. The mirror support 24 may be rotated about the vertical axis 28 continuously at a same rate or the rate may be changed depending upon the position of the first mirror 22.

The assembly 20 is characterized by having a pivotal connection 36 between the first mirror 22 and the mirror support 24 for allowing oscillation of the first mirror 22 about a horizontal axis 48 relative to a diode 30 during rotation of the mirror support 24 about the vertical axis 28, as shown in FIG. 1. The pivotal connection 36 is being driven by an oscillation drive 46 for oscillating the first mirror 22 about the horizontal axis 48 relative to the diode 30. The oscillation drive 46 is preferably a motor but may be any device capable of oscillating the first mirror 22 about the horizontal axis 48. The oscillation drive 46 is further defined by being fixedly attached to the platform 26. The oscillation drive 46 is connected to an oscillation encoder 50 for measuring revolutions of the oscillation drive 46 and transmitting an oscillation signal 134 to the processor 52 for determining a position of the first mirror 22 about the horizontal axis 48.

Figure 3:
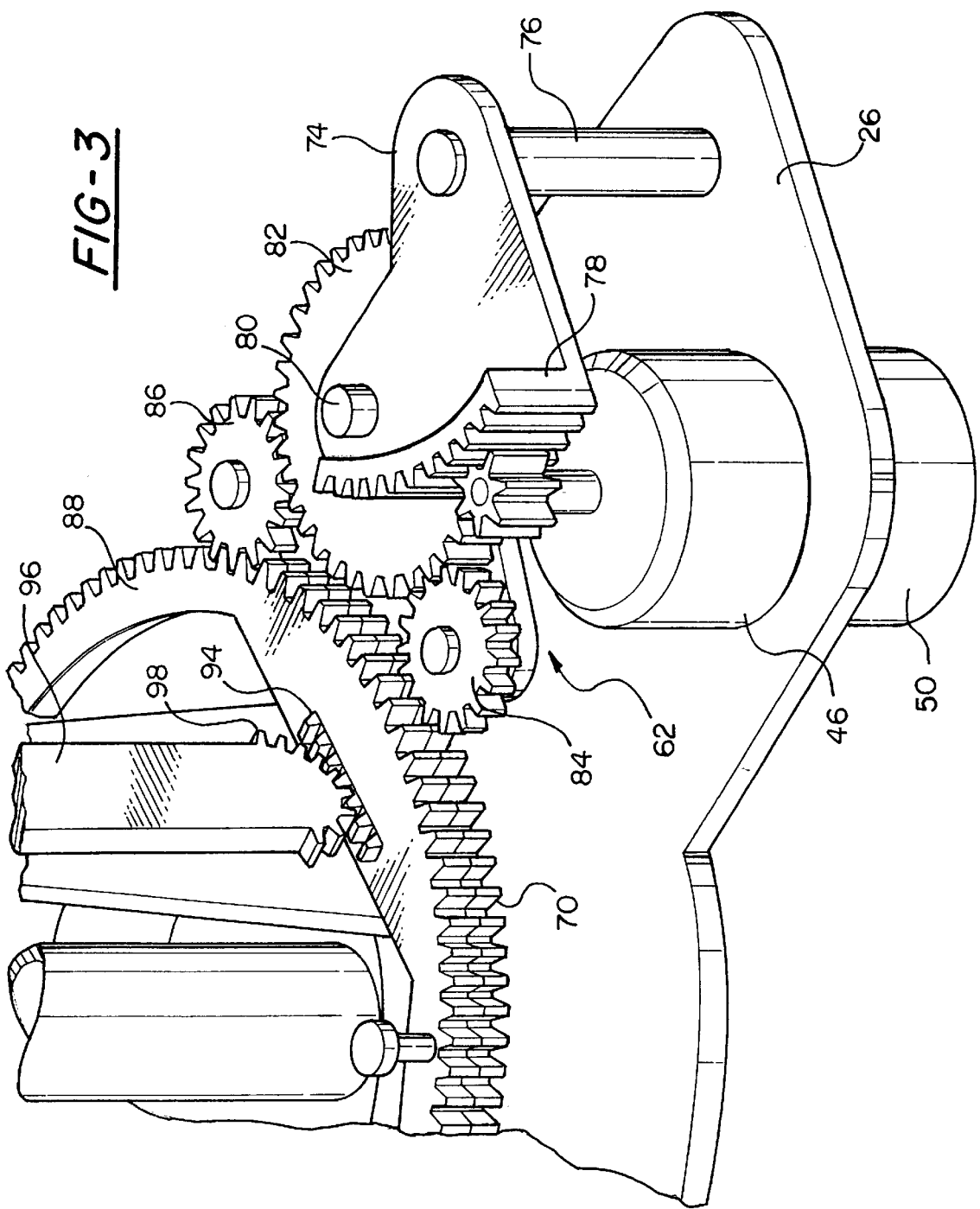
FIG. 3 is a perspective view of an oscillation drive and plurality of gears for oscillating a first mirror about a horizontal axis.
Figure 6:
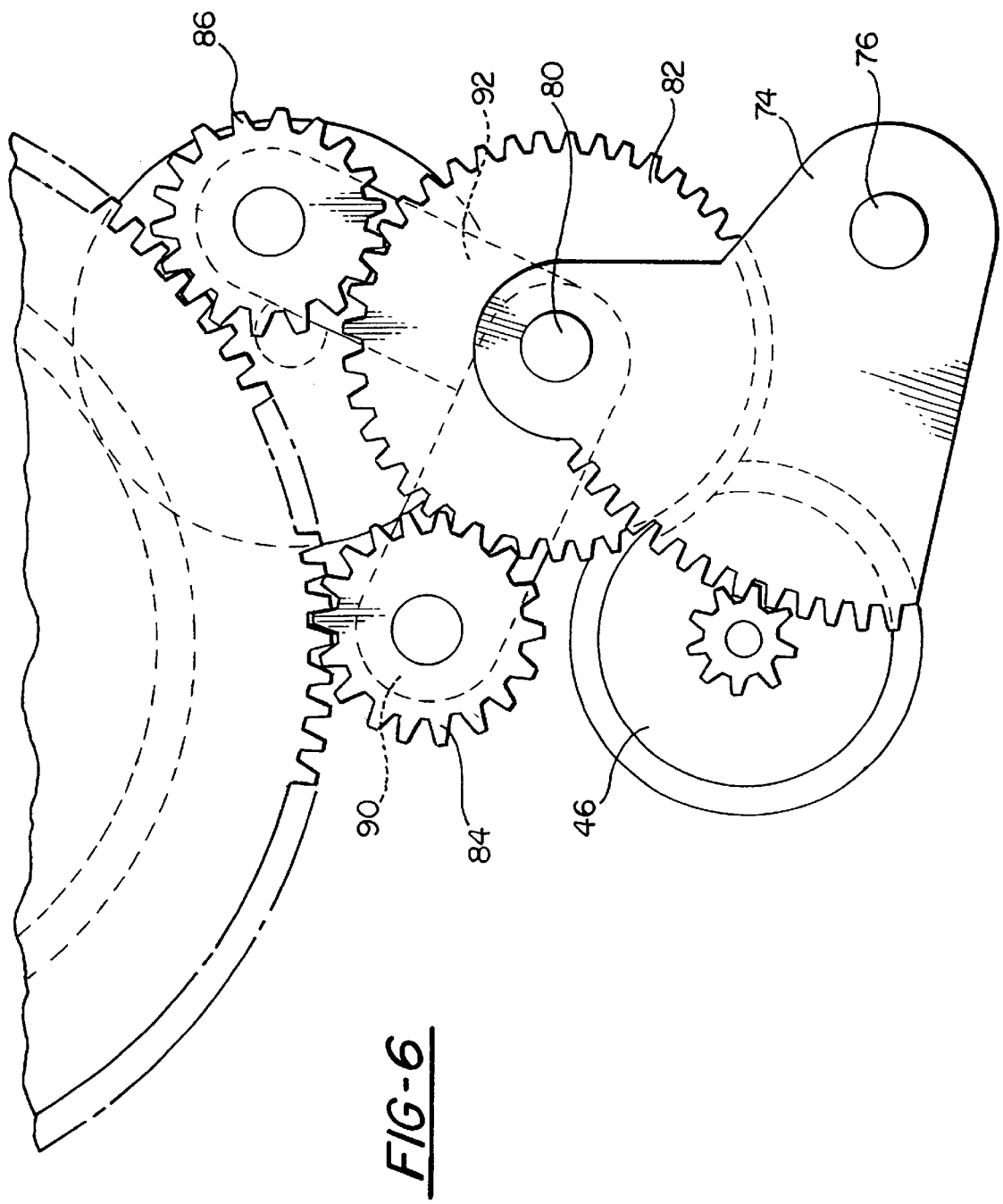
FIG. 6 is a top view of the oscillation drive and plurality of gears for oscillating the first mirror about the horizontal axis.

The oscillation drive 46, as shown in FIG. 3, is connected to a plurality of gears 62. The plurality of gears 62 is interposed between the oscillation drive 46 and the first mirror 22 for driving the first mirror 22 about the horizontal axis 48. In one embodiment, the plurality of gears 62 includes a pivot gear 74 operatively connected to the oscillation drive 46 for oscillating the first mirror 22 about the horizontal axis 48. The pivot gear 74 has a first shaft 76 which is fixedly attached to the platform 26 and a gear face 78 for engaging the oscillation drive 46. The pivot gear 74 also has a second shaft 80 which is connected to a rotary gear 82. The rotary gear 82 is in running engagement with a first rotating gear 84 and a second rotating gear 86. The first rotating gear 84 and the second rotating gear 86 each are mounted to the rotary gear 82 by a first bar 90 and a second bar 92, respectively as shown in FIG. 6. The first bar 90 and the second bar 92 attaches to the second shaft 80 for allowing the first rotating gear 84 and the second rotating gear 86 to pivot about the second shaft 80. The first rotating gear 84 and the second rotating gear 86 are a specified distance from each other.

The first rotating gear 84 is in running engagement with the hub 70 and the first rotating gear 84 rotates the rotary gear 82 at the same rate as the rotation drive 56 rotates the hub 70, as shown in FIG. 3. The rotary gear 82 then rotates the second rotating gear 86 which rotates the rotating ring 88 at the same rate the rotation drive 56 rotates the hub 70. The rotating ring 88 has a flat gear 94 for shifting a lever 96. The lever 96 has a first end 98 and a second end 100. The lever 96 has a mirror shaft 102 which is attached to the platform 26 at the second end 100. The first end 98 has a plurality of gear teeth 104 in running engagement with the flat gear 94. The second end 100 is in running engagement with a drive gear 106. The drive gear 106 is connected to the shaft of the first mirror 22.

Referring to FIG. 3, when the oscillation drive 46 is operated, the pivot gear 74 is pivoted about the first shaft 76. As the pivot gear 74 moves, the second shaft 80 rotates the first rotating gear 84 and the second rotating gear 86. As the first rotating gear 84 and the second rotating gear 86 are rotated, the distance between their shafts is made smaller or larger depending on the operation of the oscillation drive 46. The movement of the first rotating gear 84 and the second rotating gear 86 shift the position of the hub 70 with respect to the rotating ring 88. The flat gear 94 shifts the first end 98 of the lever 96 which in turn rotates the second end 100. As the second end 100 rotates, the drive gear 106 rotates the first mirror 22 about the horizontal axis 48.

An alternative embodiment for the plurality of gears 62 is shown in FIG. 9. The plurality of gears 62 includes a screw rod 108 interposed between the first mirror 22 and the oscillation drive 46 for oscillating the first mirror 22 about the horizontal axis 48. The screw rod 108 includes a sleeve 110 having a hollow portion 112, a nut 114 mounted within the sleeve 110, and a drive shaft 116 inserted within the sleeve 110 and in threaded engagement with the nut 114. As the oscillation drive 46 is operated, the drive shaft 116 is rotated and the nut 114 moves up and down the length of the drive shaft 116. The sleeve 110 is attached to the first mirror 22 and moving the nut 114 rotates the first mirror 22 about the horizontal axis 48. The first motor 46 is attached to the platform 26 by a joint 130. The joint 130 is preferably a universal joint but maybe any other joint for allowing rotation.

Figure 8:
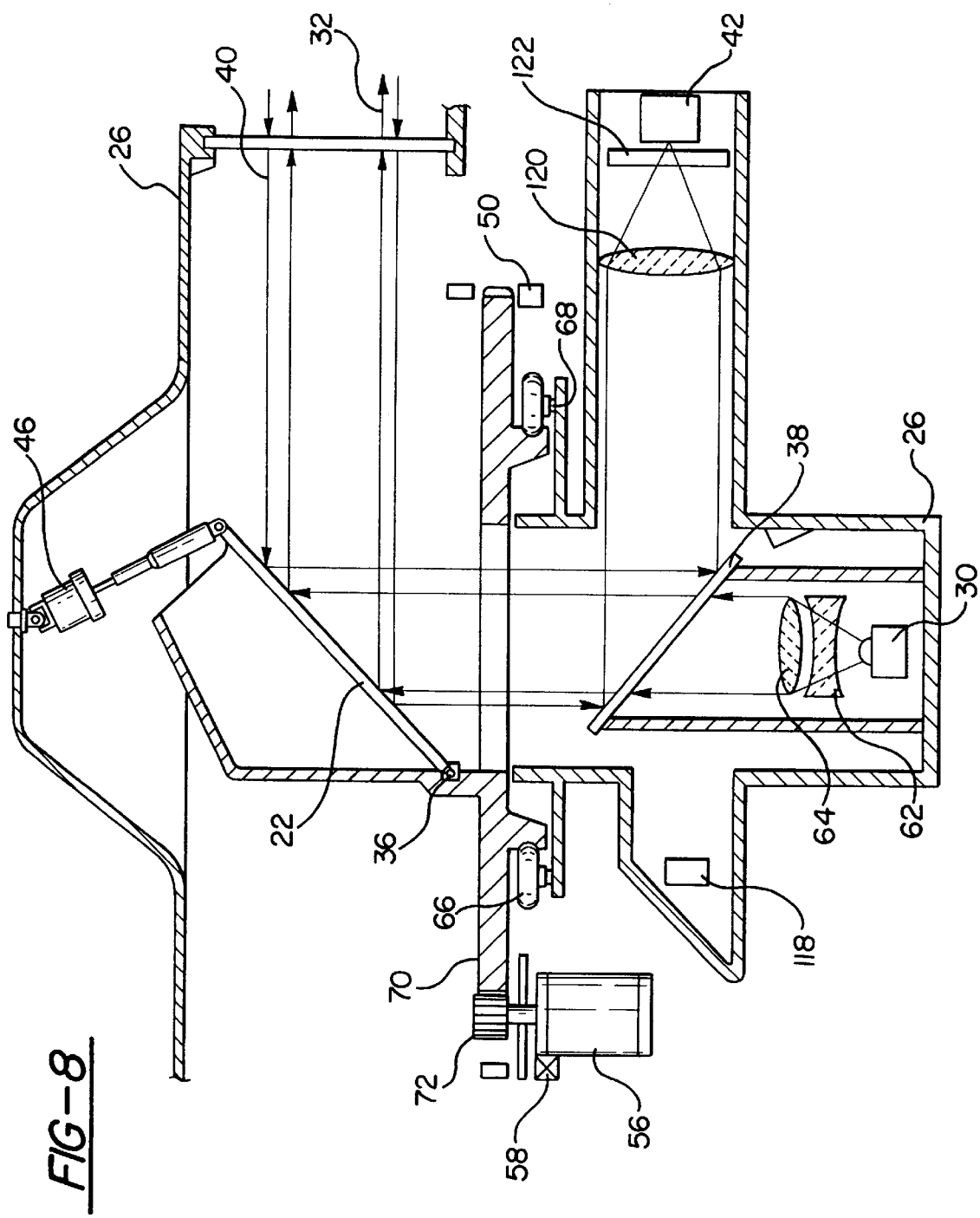
FIG. 8 is a cross-sectional view of an alternative embodiment of the laser guidance assembly for the lawn mower.

The diode 30 is attached to the platform 26 for emitting a laser beam 32 in a laser path 34, as shown in FIGS. 7 & 8. The laser path 34 is defined by passing the laser beam 32 through a first lens 62 which is attached to the platform 26. The first lens 62 may be any type of lens, specifically a concave lens for expanding the laser beam 32. The laser path 34 also includes a second lens 64 for projecting the laser beam 32 as a line of light. The second lens 64 is attached to the platform 26 and may be of such a lens as is commonly referred to as a convex lens. Alternately, the laser beam 32 may be projected as a line of light by reflecting off the first mirror 24 wherein the first mirror 24 is curved. Preferably, the line of light is ten feet tall by one inch wide at a distance of three hundred feet from the assembly 20. After the laser beam 32 has passed through the second lens 64, the laser beam 32 passes through a second mirror 38. The diode 30 is modulated by a laser driver which may alternatively modify the amplitude, frequency, or duration of diode 30.

The second mirror 38 is supported by the platform 26 and fixed relative to the platform 26 for reflecting a reflected laser beam 40 from the first mirror 22. FIG. 10 shows a top view of the second mirror 38 having a filter section 44 and reflective section 46. The filter section 44 allows the laser beam 32 to pass therethrough and to reflect off the first mirror 22 and reflects the reflected laser beam 40 to a first detector 42. The reflective section 44 is preferably partially reflective wherein a percentage of the light is reflected and the residual passes through. However, the filter section 44 may be completely removed to let the entire laser beam 32 pass through. The first detector 42 is supported by the platform 26 for detecting the reflected laser beam 40 that is reflected from the second mirror 38 and for generating a first signal 132. The reflective section 46 reflects the reflected laser beam 40 from the first mirror 22 to the first detector 42.

As the laser beam 32 passes through the second mirror 38, the laser beam 32 has a narrow diameter which allows a majority of the laser beam 32 to pass through the filter section 44 of the second mirror 38. The laser beam 32 that is wider than the filter section 44 is reflected off the reflective section 46 to a beam dump, as shown in FIGS. 7 & 8. A second detector 118 is attached to the platform 26 and located in the beam dump to measure the amount of the laser beam 32 that does not pass through the second mirror 38. The second detector 118 transmits a second signal to the processor 52 upon detection of the laser beam 32.

Figure 12:
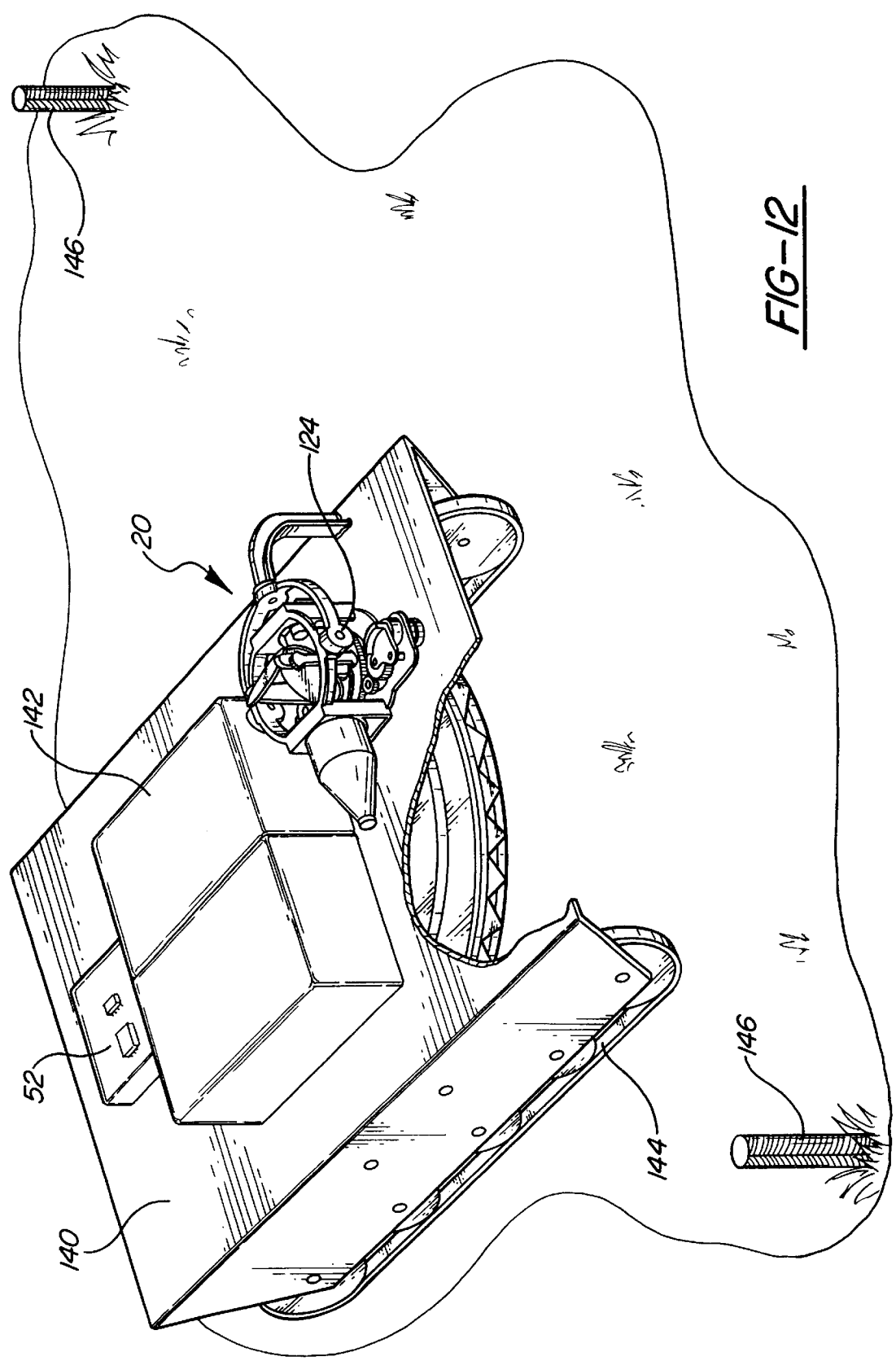
FIG. 12 is a perspective view of a lawn mower having the laser guidance assembly positioned upon a carriage.

The laser beam 32 is directed back towards the assembly 20 by a plurality of course reflectors 146 which are positioned about an area, as shown in FIG. 12. The course reflectors 146 are preferably corner cubes which allow no divergence of the laser beam 32. However, the course reflectors 146 may be any other type of reflective element for returning the laser beam 32 to the assembly 20. Preferably, the course reflectors 146 are three inches tall by one inch wide and divided into three one inch square sections. Each section is positioned at a specific angle different from each other for allowing the laser beam 32 to be reflected. The reflected laser beam 40 may return with a larger diameter than was passed through the second mirror 38. The reflected laser beam 40 is reflected by the first mirror 22 and the second mirror 38. Some light from the reflected laser beam 40 will pass through the filter section 44 of the second mirror 38, but the majority will be reflected to a third lens 120 which is supported by the platform 26 for focusing the reflected laser beam 40. The reflected laser beam 40 then passes through a filter 122 which is supported by the platform 26 for filtering the reflected laser beam 40 for detection by the first detector 42. The modulation of the diode 30 allows any light interference to be calculated when detecting the reflected laser beam 40.

The assembly 20 may also include a plurality of brackets 124 supporting the platform 26 for allowing the platform 26 to remain normal with gravity, as shown in FIG. 1. The brackets 124 may be any type of gimbaled bracket which allow the platform to remain normal with gravity. In one embodiment, the plurality of brackets 124 each have a magnetic plate positioned between each of the plurality of brackets 124 and the platform 26. The magnetic plates dampen the movement of the platform 26.

The processor 52 integrates the first signal 132 which is the reflected laser beam 40 signal, the oscillation signal 134 for the position of the first mirror 22 about the horizontal axis 48, and the rotational signal 136 for the position of the first mirror 22 about the vertical axis 28, as shown in FIG. 11. The processor 52 inputs the signals into an algorithm for calculating the precise location of the lawn mower positioned in the area based on the reflected laser beam 40. The processor 52 also receives a directional signal 138 from a rate-of-change detector in response to a change of direction of the lawn mower. The rate-of-change detector maybe a bimetallic strip which measures the forces of inertia if the lawn mower changes direction such as a rate gyro. The rate-of-change detector may also include an accelerometer, inclinometer, or an electronic compass. The directional signal 138 is utilized in addition to the laser guidance assembly and is relied upon by the lawn mower if the reflected laser beam 40 is not detected. Referring to FIG. 12, the processor 52 is mounted on a carriage 140 for moving the assembly 20 over the area. A power unit 142 for driving the carriage 140 and a steering unit 144 for steering the carriage 140 over the area are also mounted to the carriage 140.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty has utility. In addition, the reference numerals in the claims are merely for convenience and are not to be read in any way as limiting.

What is claimed is:

1. A laser guidance assembly for a vehicle, said assembly comprising;

a platform (26) for mounting to the vehicle, a mirror support (24) rotatably supported by said platform (26) for rotation about a vertical axis (28) relative to said platform (26), a first mirror (22) supported by said mirror support (24), and a diode (30) supported on said platform (26) for emitting a laser beam (32) in a laser path to said first mirror (22) for reflection by said first mirror (22) in a generally horizontal direction to a course reflector (146) which directs a reflected laser beam (40) back to said first mirror (22), said assembly characterized by a pivotal connection (36) between said first mirror (22) and said mirror support (24) for allowing oscillation of said first mirror (22) about a horizontal axis (48) relative to and independent of said mirror support (24) and said platform (26) respectively such that said laser beam (32) is reflected by said first mirror (22) scan vertically.

2. An assembly as set forth in claim 1 including a second mirror (38) supported by said platform (26) for reflecting the reflected laser beam (40) from said first mirror (22).

3. An assembly as set forth in claim 2 including a first detector (42) supported by said platform (26) for detecting the reflected laser beam (40) that is reflected from said second mirror (38) and for generating a first signal (132).

4. An assembly as set forth in claim 3 wherein said second mirror (38) includes a filter section (44) for allowing the laser beam (32) to pass therethrough and reflect off said first mirror (22) and for reflecting the reflected laser beam (40) to said first detector (42).

5. An assembly as set forth in claim 4 wherein said second mirror (38) is fixed relative to said platform (26).

6. An assembly as set forth in claim 3 including a first lens (62) attached to said platform (26) and positioned in the laser path (34) for expanding the laser beam (32) being emitted from said diode (30).

7. An assembly as set forth in claim 6 including a second lens (64) attached to said platform (26) and positioned in the laser path (34) for projecting the laser beam (32) as a line of light.

8. An assembly as set forth in claim 7 including a third lens (120) supported by said platform (26) for focusing the reflected laser beam (40) for detection by said first detector (42).

9. An assembly as set forth in claim 8 including a filter (122) supported by said platform (26) for filtering the reflected laser beam (40) for detection by said first detector (42).

10. An assembly as set forth in claim 9 including a carriage (140) for moving over an area, a power unit (142) for driving said carriage (140) over the area, and a steering unit (144) for steering said carriage (140) over the area.

11. An assembly as set forth in claim 3 wherein said second mirror (38) includes a reflective section (46) for reflecting the reflected laser beam (40) from said first mirror (22) to said first detector (42).

12. An assembly as set forth in claim 11 including a rate-of-change detector for transmitting a directional signal (138) to said processor (52) in response to a change of direction of the lawn mower.

13. An assembly as set forth in claim 12 including a second detector (118) attached to said platform (26) and said second detector (118) detecting the laser beam (32) that does not pass through said second mirror (38) and transmitting a second signal to said processor (52).

14. An assembly as set forth in claim 1 including a plurality of brackets (124) supporting said platform (26) for allowing said platform (26) to remain normal with gravity.

15. An assembly as set forth in claim 1 including a plurality of bearing wheels (66) attached to said platform (26) for rotatably supporting said mirror support (24).

16. An assembly as set forth in claim 1 wherein said diode (30) for emitting the laser beam (32) is fixedly attached to said platform (26).

17. An assembly as set forth in claim 1 including a processor (52) responsive to said first signal (132) for determining a position of said first mirror (22) about said horizontal and said vertical axis (48, 28) to determine the position of the lawn mower relative to said course reflector (146).

18. An assembly as set forth in claim 17 including a rotation drive (56) operatively connected to said mirror support (24) for rotating said first mirror (22) about said vertical axis (28).

19. An assembly as set forth in claim 18 including a rotation encoder (58) connected to said rotation drive (56) and said processor (52) for measuring revolutions of said rotation drive (56) and transmitting a rotational signal (136) to said processor (52) for determining a position of said first mirror (22) about said vertical axis (28).

20. An assembly as set forth in claim 18 wherein said rotation drive (56) is further defined by being fixedly attached to said platform (26).

21. An assembly as set forth in claim 17 including an oscillation drive (46) being operatively connected to said pivotal connection (36) for oscillating said first mirror (22) about said horizontal axis (48) relative to said diode (30).

22. An assembly as set forth in claim 21 including a plurality of gears (62) interposed between said oscillation drive (46) and said first mirror (22) for driving said first mirror (22) about said horizontal axis (48).

23. An assembly as set forth in claim 21 wherein said oscillation drive (46) is further defined by being fixedly attached to said platform (26).

24. An assembly as set forth in claim 21 including an oscillation encoder (50) connected to said oscillation drive (46) and said processor (52) for measuring revolutions of said oscillation drive (46) and transmitting an oscillation signal (134) to said processor (52) for determining a position of said first mirror (22) about said horizontal axis (48).

25. An assembly as set forth in claim 21 further including a plurality of gears (62) interconnecting said oscillation drive (46) and said first mirror (22).

26. An assembly as set forth in claim 25 wherein said plurality of gears (62) is further defined as a pivot gear (74) operatively connected to said oscillation drive (46) and said plurality of gears (62) for oscillating said first mirror (22) about said horizontal axis (48).

27. An assembly as set forth in claim 25 wherein said plurality of gears (62) is further defined as a screw rod (108) interposed between said first mirror (22) and said oscillation drive (46) for oscillating said first mirror (22) about said horizontal axis (48).

28. An assembly as set forth in claim 27 wherein said screw rod (108) is further defined by including a sleeve (110) having a hollow portion (112), a nut (114) mounted within said sleeve (110), and a drive shaft (116) inserted within said sleeve (110) and in threaded engagement with said nut (114) wherein rotation of said drive shaft (116) by said oscillation drive (46) adjusts the length of said screw rod (108).

\* \* \* \* \*